United States Patent [19]

Borror

[11] Patent Number: 4,996,905
[45] Date of Patent: Mar. 5, 1991

[54] RACK AND PINION STEERING SYSTEM

[75] Inventor: Bruce M. Borror, Mount Carmel, Tenn.

[73] Assignee: TRW Inc., Lyndhurst, Ohio

[21] Appl. No.: 351,430

[22] Filed: May 12, 1989

[51] Int. Cl.$^5$ .............................................. F15B 9/10
[52] U.S. Cl. .............................. 91/375 A; 74/388 PS; 180/148; 403/334
[58] Field of Search ......................... 74/388 PS, 422; 180/147, 148; 464/97; 403/334; 91/375 A

[56] References Cited

U.S. PATENT DOCUMENTS

| | | | |
|---|---|---|---|
| 3,296,940 | 1/1967 | Eddy et al. | 91/375 A |
| 4,177,714 | 12/1979 | Schluckebier | 91/375 A |
| 4,198,898 | 4/1980 | Elser | 91/375 A |
| 4,285,266 | 8/1981 | Elser | 91/375 A |
| 4,378,030 | 3/1983 | Duffy | 137/625.24 |
| 4,406,341 | 9/1983 | Bertin | 180/148 |
| 4,793,433 | 12/1988 | Emori et al. | 91/375 A |

OTHER PUBLICATIONS

Goodheart-Willcox *Automotive Encyclopedia*, 1983, p. 611.

*Primary Examiner*—William E. Wayner
*Attorney, Agent, or Firm*—Tarolli, Sundheim & Covell

[57] ABSTRACT

A fluid power assisted rack and pinion steering system includes a steering gear assembly having a valve core, a valve sleeve, and an axially extending torsion bar. The input shaft of the steering gear is formed as the valve core, and one end of the torsion bar is pinned to the input shaft before the valve is balanced. A pinion is connected to and rotates with the valve sleeve, and the other end of the torsion bar is rotationally fixed to the pinion. The pinion has an axially extending tapered bore in which is received a matching tapered portion of the torsion bar. The tapered portion of the torsion bar engages the tapered portion of the bore in the pinion in a rotationally fixed locking engagement. Upon assembly of the steering gear, if the valve is not properly balanced, the tapered connection is easily loosened to adjust the relative angular orientation of the pinion to the torsion bar, and then retightened to again fix the torsion bar to the pinion.

15 Claims, 2 Drawing Sheets

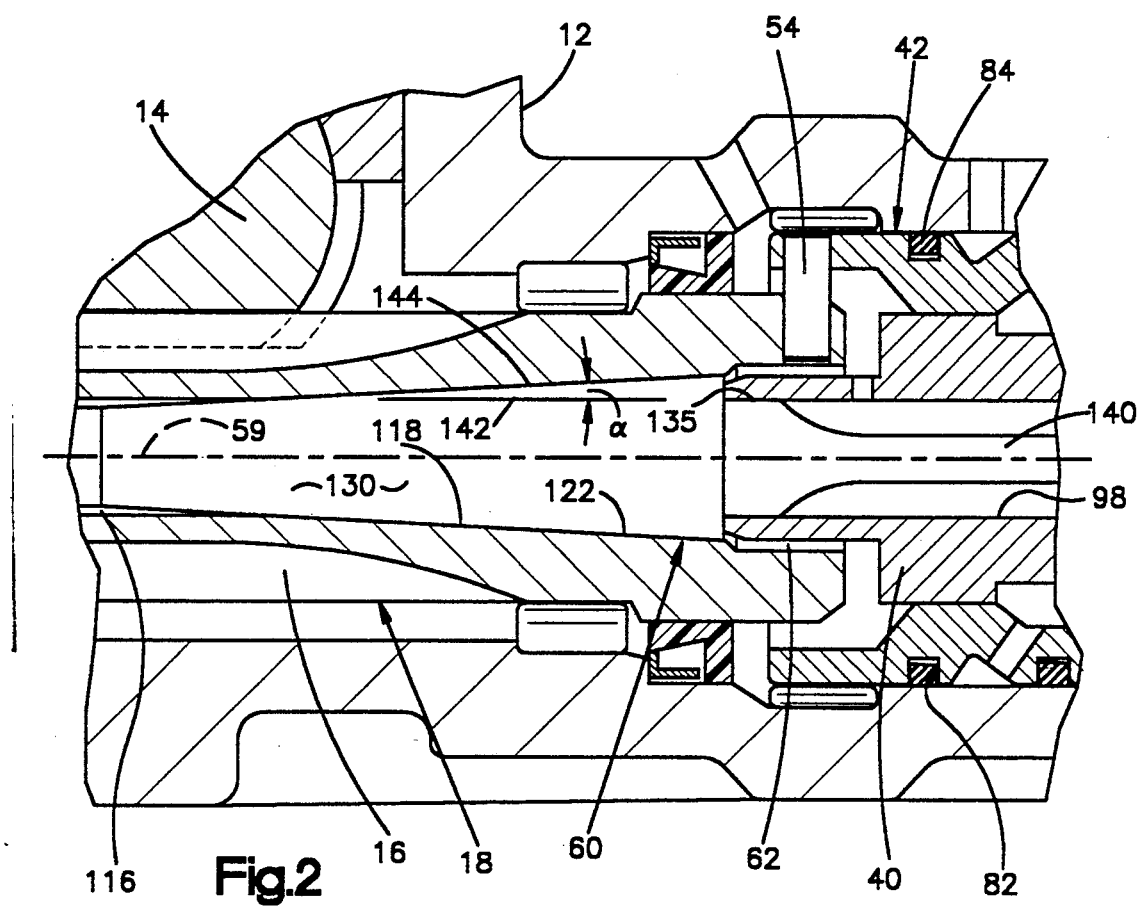
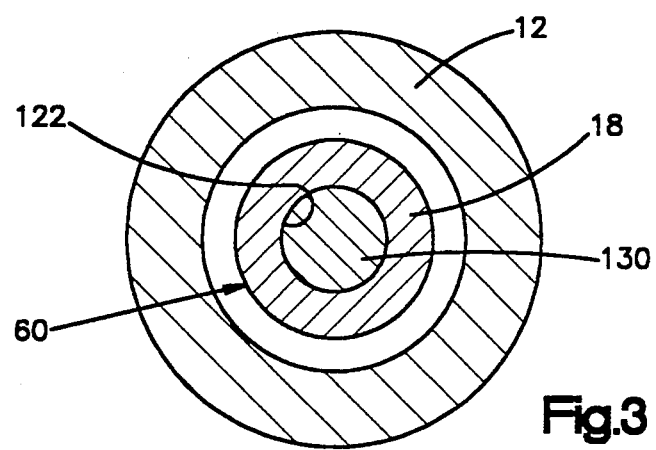

RACK AND PINION STEERING SYSTEM

BACKGROUND OF THE INVENTION

1. Technical Field

This invention relates to power assisted rack and pinion steering systems for vehicles. More specifically, this invention relates to the connection between a torsion bar and a pinion in a rack and pinion steering gear assembly.

2. Prior Art

In a typical fluid power assisted steering system for a vehicle, a rotary valve directs the flow of hydraulic fluid under pressure to a hydraulic motor, and the motor moves steering linkage to effect turning of the steerable wheels of the vehicle. The rotary valve includes a valve core and a valve sleeve which are relatively rotatable. A steering input shaft extending from the hand wheel is formed as the valve core. One end of a torsion bar is rotationally fixed to the input shaft. An output member is rotationally fixed to the valve sleeve. The other end of the torsion bar is rotationally fixed to the output member.

When there is a resistive load on the output member from the steerable vehicle wheels, steering torque transmitted through the input shaft causes the torsion bar to twist. This action actuates the valve from a neutral condition and changes the rotary position of the valve core relative to the valve sleeve and, in turn, changes the fluid flow through the valve and to the motor. The motor moves the steering linkage to turn the steerable vehicle wheels. Steering linkage movement moves the output member in a follow-up manner to rotate the valve sleeve relative to the valve core and return the rotary valve to its neutral condition.

In rack and pinion steering gear assemblies, the pinion is the output member. Typically, one end of the torsion bar is first press fitted to the pinion. Next, the other end of the torsion bar is pinned to the input shaft by a drilling, reaming and pinning operation. Because the torsion bar is already rotationally fixed to the pinion, during this drilling, reaming and pinning operation the valve elements must be maintained in a hydraulically centered or balanced condition to avoid biasing the valve. The task of holding exact angular orientation between the torsion bar and the input shaft throughout the drilling, reaming and pinning operation is complex and requires expensive fixturing. Should angular movement or incorrect initial positioning occur, resulting in an unbalanced valve, the torsion bar is scrapped, increasing scrap costs and labor costs. Also, the drilling, reaming and pinning operation is conducted outside the final steering gear assembly because of the generation of metal chips during drilling and reaming.

There are various known means of connecting the torsion bar to the output member, including such methods as pinning and press fitting. Another method is shown in U.S. Pat. No. 4,285,266 which describes a worm and sector steering gear wherein tightening a nut against the end of the output member moves a tapered sleeve axially to clamp the torsion bar. In the sector gear steering assembly shown in U.S. Pat. No. 4,177,714, an end of the torsion bar is connected to a hub of the output member by a tapered sleeve received in a tapered bore in the hub.

SUMMARY OF THE INVENTION

In accordance with the present invention, a torsion bar is rotationally fixed to a pinion in a manner which affords both ease of assembly and ease of adjustment for relative angular orientation. One end of the torsion bar is first pinned to the input shaft, which comprises the valve core. The free end of the torsion bar is then passed through an axially extending bore in the pinion, which is connected to the valve sleeve, until a tapered portion of the torsion bar engages a tapered surface of the bore inside the pinion. At this time, the free end of the torsion bar, which is threaded, projects outwardly from the end of the pinion. A nut is then tightened onto the projecting threaded end of the torsion bar. As the nut is tightened, the tapered portion of the torsion bar is drawn into a rotationally fixed locking engagement with the tapered bore surface of the pinion. The valve is then tested for proper balance.

In accordance with a feature of the present invention, if the assembled valve is not properly balanced, the threaded connection is loosened, and the torsion bar is rotated relative to the pinion to establish correct relative angular orientation of the valve elements. The threaded connection may then be retightened to again fix the torsion bar to the pinion.

In accordance with another feature of the present invention, the torsion bar is pinned to the input shaft before the valve is balanced. Thus, during the drilling, reaming and pinning operation, the valve need not be kept in a hydraulically centered or balanced condition, and so the need to hold exact orientation between the torsion bar and the input shaft is eliminated. Should angular movement or incorrect initial positioning occur during the assembly procedure, resulting in an unbalanced valve, the position of the torsion bar is easily adjusted relative to the pinion, and the torsion bar need not be scrapped.

BRIEF DESCRIPTION OF THE DRAWINGS

Further features of the present invention will become apparent to those of ordinary skill in the art to which the present invention relates from reading the following description of a preferred embodiment with reference to the accompanying drawings, in which:

FIG. 2 is an enlarged view of a portion of the steering gear system of FIG. 1; and FIG. 3 is an enlarged sectional view taken along the section line 3—3 of FIG. 1.

DESCRIPTION OF A PREFERRED EMBODIMENT

Figure 1:
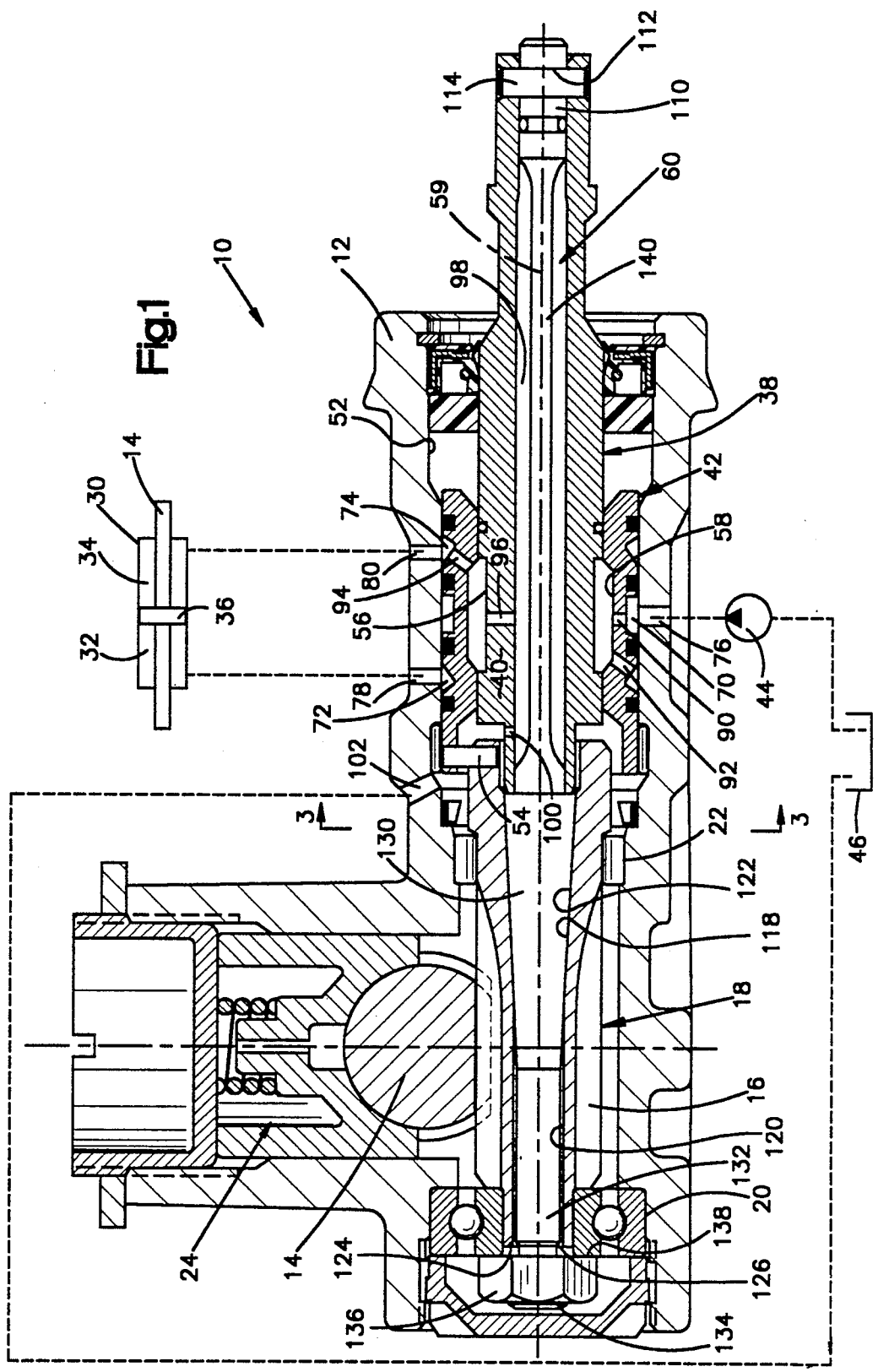
FIG. 1 is a schematic view, partially in section, of a fluid power assisted rack and pinion steering system in accordance with the present invention.

FIG. 1 illustrates schematically a fluid power assisted vehicle steering system which includes a rack and pinion steering gear assembly 10. The steering gear assembly 10 includes a housing 12. Extending through the housing 12 is a rack bar 14, the teeth of which cooperate with the teeth 16 of a pinion 18. The pinion 18 is journalled in bearings 20 and 22 in the housing 12. The rack bar 14 is biased into engagement with the pinion 18 by a spring-loaded yoke 24.

The steering system shown in FIG. 1 includes a hydraulic motor 30 (shown schematically) having two chambers 32 and 34 on opposite sides of a piston 36. The piston 36 is fixed to the rack bar 14. The steering gear assembly 10, which includes a rotary valve, directs fluid under pressure from a pump 44, drawn from a reservoir 46, to the motor 30. The motor 30 moves the rack bar 14 axially, to effect steering of steerable wheels of the vehicle. Axial displacement of the rack bar 14 also rotates the pinion 18 in a follow-up manner to return the rotary valve to a neutral condition.

A steering input shaft 38, which is rotatable with the vehicle steering wheel (not shown), extends into the housing 12 and forms an inner valve member or valve core 40. The valve core 40 may alternatively be an element separate from the input shaft 38, but in any event is rotatable with the input shaft 38. The valve core 40 is located within an outer valve member or valve sleeve 42 rotatable within a bore 52 of the housing 12. The valve sleeve 42 is rotationally fixed to the pinion 18 by a pin 54. Axially extending control grooves 56 in the valve core 40 cooperate with axially extending control grooves 58 in the valve sleeve 42 to direct fluid flow within the steering gear assembly 10. The valve members 40 and 42 are coaxial with the axis of rotation 59 of the pinion 18 and the input shaft 38.

When the input shaft 38 is rotated relative to the pinion 18, the motor 30 effects power-assisted steering of the vehicle. The input shaft 38 and the pinion 18 are connected through an axially extending torsion bar 60 for a limited amount of relative rotation. Should this limited amount of relative rotation be exceeded, flats 62 on the input shaft 38 engage cooperating surfaces on the end of the pinion 18. Further rotation of the input shaft 38 directly rotates the pinion 18, and steering is effected manually.

A plurality of annular grooves are formed in the outer surface of the valve sleeve 42. A fluid inlet groove 70 is supplied with high pressure fluid from the pump 44 through a port 76 in the housing 12. A first motor groove 72 is in fluid communication with one chamber 32 of the motor 30 via a port 78 in the housing 12. A second motor groove 74 is in fluid communication with the other chamber 34 of the motor 30 via a port 80 in the housing 12. A series of annular seal grooves 82 (FIG. 2) carry a series of annular seals 84 which bear against the bore 52 of the housing 12. The seals 84 block fluid leakage between the various grooves 70, 72, and 74.

A passage 90 (FIG. 1) connects the fluid inlet groove 70 with the interior of the valve sleeve 42. A passage 92 connects the first motor groove 72 with the interior of the valve sleeve 42. A passage 94 connects the second motor groove 74 with the interior of the valve sleeve 42.

Low pressure return fluid passes through a radial port 96 in the valve core 40 and into a bore 98 extending axially within the input shaft 38. The bore 98 is in fluid communication with the reservoir 46 via another passage 100 in the input shaft 38 and a port 102 in the housing 12.

The bore 98 in the input shaft 38 is axially aligned with a bore 116 in the pinion 18. The pinion bore 116 includes a tapered bore section 118 defined by a tapered bore surface 122, and a non-tapered bore section 120. The non-tapered bore section 120 extends through an end surface 124 of the pinion 18, forming an opening 126 in the end surface 124.

The torsion bar 60 extends axially through the bore 98 in the input shaft 38 and through the bore 116 in the pinion 18. The torsion bar 60 includes an end portion 110; a torsionally flexible portion 140 disposed within the input shaft bore 98; a tapered portion 130 disposed within the tapered pinion bore section 118; a non-tapered portion 132 disposed within the non-tapered pinion bore section 120; and a threaded end portion 134 which extends axially outwardly through the opening 126 in the pinion end surface 124. A bearing surface 135 (FIG. 2) on the torsion bar 60 supports a portion of the input shaft 38 for rotation relative to the torsion bar 60.

The tapered pinion bore section 118 in the pinion 18 is circular in cross-section and has a diameter which varies axially. The tapered bore section 118 is narrower at its end farther from the input shaft 38. The tapered portion 130 of the torsion bar 60 is tapered at an angle which matches the tapered bore surface 122 of the pinion 18. The torsion bar 60 is circular in cross-section, that is, diametrically opposite points on the torsion bar 60 are spaced the same distance from the axis 59.

The end 110 of the torsion bar 60 is pinned to the input shaft 38. To assemble the end 110 of the torsion bar 60 to the input shaft 38, the torsion bar 60 is first inserted axially into the bore 98 in the input shaft 38, in a direction to the right as viewed in FIG. 1. The input shaft 38 and the end 110 of the torsion bar 60 are then drilled and reamed to form a radially extending opening 112 for insertion of a pin 114. The pin 114 is inserted, and the end 110 of the torsion bar 60 is thereby rotationally fixed to the input shaft 38.

After the input shaft 38 is pinned to the torsion bar 60, the torsion bar 60 is assembled to the pinion 18 by inserting the torsion bar 60 axially into the bore 116 of the pinion 18, in a direction to the left as viewed in FIG. 1, until the threaded end 134 of the torsion bar 60 projects axially outwardly of the pinion 18. A nut 136 is threaded on the threaded end 134 of the torsion bar 60 and rotated until an axial face 138 on the nut 136 contacts the bearing 20. The bearing 20 does not move axially inwardly relative to the housing 12. Therefore, further rotation of the nut 136 onto the threaded end 134 of the torsion bar 60 draws the torsion bar 60 axially within the pinion 18 until the tapered portion 130 of the torsion bar 60 engages the tapered bore surface 122 of the pinion 18. As the nut 136 is rotated further, the torsion bar 60 continues to be drawn axially, and draws the pinion 18 along with it, until the pinion 18 is drawn up tight against the bearing 20. As the nut 136 is tightened further, drawing the torsion bar 60 axially, the connection between the tapered portion 130 of the torsion bar 60 and the tapered bore surface 122 of the pinion 18 becomes so tight that the tapered portion 130 of the torsion bar 60 does not rotate relative to the pinion 18. The nut 136 may be locked in place on the threaded end 134 of the torsion bar 60 by any suitable known thread locking means. The tapered portion 130 of the torsion bar 60 is thereby rotationally fixed to the pinion 18.

The operation of the steering gear assembly 10, as to fluid flow therethrough, is conventional. Hydraulic fluid under pressure from the pump 44 continuously enters the steering gear assembly 10 through the port 76, passing into the inlet groove 70 and thence through the passage 90 into the control grooves 56 and 58. A rotational steering input on the input shaft 38, against a load on the pinion 18, causes the torsion bar 60 to twist along its torsionally flexible portion 140. The valve core 40 is rotated relative to the valve sleeve 42, displacing the control grooves 56 and 58 from the neutral condition. The relative angular displacement of the grooves 56 and 58 directs fluid under pressure to one or the other of the motor chambers, for example, the motor chamber 32, increasing the pressure in that motor chamber. At the same time, the relative angular displacement of the control grooves 56 and 58 provides a more open path for passage of fluid out of the other motor chamber 34, thus decreasing the pressure in that motor chamber. The increase in pressure in the one motor chamber, combined with the decrease in pressure in the other motor chamber, moves the piston 30, thus moving the rack bar 14 axially and effecting steering movement.

The angle of taper α is shown schematically in FIG. 2. The angle of taper α is the angle between a line 142 extending parallel to the axis 59 of the torsion bar 60 and pinion 18, and the matching tapered surfaces of the torsion bar 60 and pinion 18. The angle of taper α employed in the tapered connection between the pinion 18 and the torsion bar 60 is determined in accordance with engineering requirements of the particular application. Too small an angle of taper α would produce very good locking qualities but too much axial variation, while too large an angle α would hold good axial variation yet would not provide adequate locking qualities. The angle of taper α is preferably in the range of from about 1.5° to about 6°. Routine experimentation can determine the optimum taper for a particular application. A steering gear assembly 10 in accordance with the present invention and constructed with an angle of taper α of three degrees has performed satisfactorily.

In accordance with a feature of the present invention, the input shaft 38 is pinned to the torsion bar 60 outside of the steering gear assembly 10 and before the valve is balanced. Thus, any metal chips which are generated during the drilling and reaming operation will not get into the steering gear assembly 10. Also, it is not necessary to hold any particular relative angular orientation of the torsion bar 60 and the input shaft 38 during the assembling of the two parts, because the connection between the pinion 18 and the torsion bar 60 is mad later and is adjustable for relative angular orientation.

In accordance with another feature of the present invention, adjustment and setting of the proper relative angular orientation of the torsion bar 60 and the pinion 18 may be easily accomplished during assembly. The input pressure at the inlet port 76 may be monitored while the assembled valve is fluid tested. With small angle changes, the pressure visibly increases. Once the valve is found to be balanced, the nut 136 is tightened. If undesired relative angular movement occurs during the assembly procedure, the assembly may be loosened and re-set rapidly, because the matching tapered portions on the pinion bore and torsion bar are circular in cross-section. Some design options to lessen the chances of misalignment of the valve parts during assembly could include optimizing the pitch of the threads on the nut 136 and on the threaded end portion 134 of the torsion bar 60; optimizing the taper angle; applying an axial load (in compression or tension) during the tightening procedure; and addition of an anti-rotational feature, such as a screwdriver slot in the axial end of the threaded end portion 134 of the torsion bar 60.

Having described a preferred embodiment of the invention, I claim:

1. A rack and pinion steering gear assembly comprising:
   an input shaft;
   a pinion coaxial with said input shaft and having a tapered bore surface defining a tapered bore extending axially within said pinion, said pinion having a circular array of teeth for engaging the rack;
   an axially extending torsion bar having a first end portion, a tapered portion, and a torsionally flexible portion disposed axially between said first end portion and said tapered portion, said first end portion of said torsion bar being connected with said input shaft, said tapered portion of said torsion bar being in rotationally fixed engagement with said tapered bore surface of said pinion, said tapered portion of said torsion bar being at least partially disposed between said input shaft and at least a portion of an area of engagement of said rack with said teeth on said pinion with the rack.

2. An assembly as defined in claim 1 further comprising nut means threadedly engaging a threaded end portion of said torsion bar extending axially outwardly of said pinion, rotation of said nut means relative to said torsion bar moving said torsion bar axially to draw said tapered portion of said torsion bar into rotationally fixed engagement with said tapered bore surface of said pinion.

3. An assembly as defined in claim 2 wherein said tapered bore in said pinion aligns axially with a bore in said input shaft and said torsion bar extends axially within said input shaft and said pinion, said torsionally flexible portion of said torsion bar being disposed within said bore in said input shaft.

4. An assembly as defined in claim 3 further comprising a first valve member rotatable with said input shaft, and a second valve member rotatable with said pinion and disposed concentrically about said first valve member.

5. An assembly as defined in claim 4 wherein said tapered bore has an angle of taper in the range of from about 1.5 degrees to about 6 degrees.

6. An assembly as set forth in claim 1 and further including first valve means rotatable with said input shaft and second valve means rotatable with said pinion, said second valve means enclosing a portion of said first valve means, said torsion bar including bearing surface means disposed between said input shaft and at least a portion of the area of engagement of said teeth on said pinion with the rack for at least partially supporting said first valve means for rotation relative to said second valve means.

7. A rack and pinion steering gear assembly comprising:
   an input shaft;
   a pinion coaxial with said input shaft and having a tapered bore surface defining a tapered bore extending axially within said pinion;
   an axially extending torsion bar having a first end portion, a tapered portion, and a torsionally flexible portion disposed axially between said first end portion and said tapered portion, said first end portion of said torsion bar being rotationally fixed to said input shaft, said tapered portion of said torsion bar being rotationally fixed to said pinion and rotationally fixedly engaging said tapered bore surface of said pinion;
   nut means threadedly engaging a threaded end portion of said torsion bar extending axially outwardly of said pinion, rotation of said nut means relative to said torsion bar moving said torsion bar axially to draw said tapered portion of said torsion bar into rotationally fixed engagement with said tapered bore surface of said pinion, said tapered bore in said pinion aligning axially with a bore in said input shaft and said torsion bar extending axially within said input shaft and said pinion, said torsionally flexible portion of said torsion bar being disposed within said bore in said input shaft; and a first valve member rotatable with said input shaft, and a second valve member rotatable with said pinion and disposed concentrically about said first valve member;

said tapered bore having an angle of taper in the range of from about 1.5 degrees to about 6 degrees.

8. An assembly as defined in claim 5 wherein said angle of taper is about three degrees.

9. An assembly as defined in claim 6 wherein said torsion bar includes bearing surface means for supporting a portion of said first valve member for rotation relative to said torsion bar.

10. A rack and pinion steering gear assembly as set forth in claim 7 wherein said tapered portion of said torsion bar is disposed between said input shaft and an area of engagement of said rack with said pinion.

11. A steering gear assembly as set forth in claim 7 further wherein said torsion bar includes surface means for supporting an end portion of said first valve member, said surface means being disposed axially between said first end portion and said tapered portion of said torsion bar.

12. A fluid power assisted rack and pinion steering gear assembly comprising:

a housing;

first valve means at least partially disposed in and rotatable relative to said housing;

a pinion coaxial with said first valve means and having a tapered surface extending axially within said pinion;

second valve means rotatable with said pinion and enclosing a portion of said fresh valve means and cooperating therewith to direct fluid flow; and an axially extending torsion bar having a first axial end portion connected with said first valve means, a torsionally flexible portion, a tapered portion received in said pinion and rotationally fixedly engaging said tapered surface of said pinion, and surface means for at least partially supporting said first valve means for rotation relative to said second valve means, said surface means being disposed between said tapered portion and said first axial end portion of said torsion bar.

13. A steering gear assembly as set forth in claim 12 wherein said pinion includes a circular array of teeth for engaging the rack, said tapered portion of said torsion bar being at least partially disposed between said first axial end portion of said torsion bar and at least a portion of an area of engagement of said teeth on said pinion with the rack.

14. A steering gear assembly as set forth in claim 12 wherein said tapered portion of said torsion bar has an angle of taper in the range of from about 1.5 degrees to six degrees.

15. A steering gear assembly as defined in claim 12 wherein said torsion bar has a second axial end portion extending axially outwardly of said pinion and including first thread means thereon, and further comprising nut means for threadedly engaging said first thread means on said torsion bar and for moving said tapered portion of said torsion bar axially into rotationally fixed engagement with said tapered surface of said pinion.

* * * * *

UNITED STATES PATENT AND TRADEMARK OFFICE
CERTIFICATE OF CORRECTION

PATENT NO. : 4,996,905

DATED : March 5, 1991

INVENTOR(S) : Bruce M. Borror

It is certified that error appears in the above-identified patent and that said Letters Patent is hereby corrected as shown below:

Column 7, Line 10, Claim 8, change "5" to --7--.

Column 7, Line 12, Claim 9, change "6" to --8--.

Column 8, Line 2, Claim 12, change "fresh" to --first--.

Signed and Sealed this

Twenty-first Day of July, 1992

*Attest:*

DOUGLAS B. COMER

*Attesting Officer*      *Acting Commissioner of Patents and Trademarks*